United States Patent
Garcia et al.

(10) Patent No.: US 12,184,933 B2
(45) Date of Patent: *Dec. 31, 2024

(54) SYSTEMS AND METHODS FOR PROVIDING RECORDING OF A BLACKED-OUT MEDIA CONTENT ITEM

(71) Applicant: Rovi Guides, Inc., San Jose, CA (US)

(72) Inventors: Jeffery Garcia, Campbell, CA (US); David Ly, San Jose, CA (US); Hung Vuong, San Jose, CA (US); Rodney Young, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,659

(22) Filed: Sep. 1, 2023

(65) Prior Publication Data
US 2023/0421848 A1 Dec. 28, 2023

Related U.S. Application Data

(63) Continuation of application No. 17/849,112, filed on Jun. 24, 2022, now Pat. No. 11,863,823, which is a continuation of application No. 17/116,440, filed on Dec. 9, 2020, now Pat. No. 11,405,689.

(51) Int. Cl.
| | |
|---|---|
| *H04N 21/45* | (2011.01) |
| *H04N 21/4147* | (2011.01) |
| *H04N 21/454* | (2011.01) |
| *H04N 21/458* | (2011.01) |

(52) U.S. Cl.
CPC ..... *H04N 21/4524* (2013.01); *H04N 21/4147* (2013.01); *H04N 21/4532* (2013.01); *H04N 21/454* (2013.01); *H04N 21/458* (2013.01)

(58) Field of Classification Search
CPC .......... H04N 21/4524; H04N 21/4147; H04N 21/4532; H04N 21/454; H04N 21/458
See application file for complete search history.

(56) References Cited

U.S. PATENT DOCUMENTS

| | | | | |
|---|---|---|---|---|
| 5,618,947 | A * | 4/1997 | Borrett | A61P 25/04 |
| | | | | 548/448 |
| 7,761,892 | B2 * | 7/2010 | Ellis | H04N 21/2143 |
| | | | | 725/86 |
| 8,028,315 | B1 * | 9/2011 | Barber | A63F 13/828 |
| | | | | 725/51 |

(Continued)

*Primary Examiner* — Timothy R Newlin
(74) *Attorney, Agent, or Firm* — Haley Guiliano LLP

(57) ABSTRACT

Systems and associated methods are described for providing recording of a blacked out media content item. A system receives a request from a first user device associated with a profile to record a media content item scheduled to broadcast on a second user device (different from the first user device) associated with the profile, at a second location. The system determines that the media content item is subject to a blackout during a blackout period within a blackout region. The system determines that the first user device and the second user device are associated with the same profile and that the first user device is at a first location outside the blackout region. The system then accesses the media content item for recording on the second user device during the blackout period. The system further transmits the recorded media content item to the first user device after expiry of the blackout period.

20 Claims, 5 Drawing Sheets

(56) References Cited

U.S. PATENT DOCUMENTS

| | | | | |
|---|---|---|---|---|
| 9,491,519 | B2* | 11/2016 | Sekiguchi | H04N 21/41265 |
| 11,405,689 | B2 | 8/2022 | Garcia et al. | |
| 2005/0272405 | A1* | 12/2005 | Tomlinson | H04N 21/4108 |
| | | | | 348/E7.056 |
| 2008/0092157 | A1* | 4/2008 | Walter | H04N 7/17354 |
| | | | | 348/E7.075 |
| 2008/0163304 | A1* | 7/2008 | Ellis | H04N 21/4334 |
| | | | | 725/50 |
| 2009/0025672 | A1* | 1/2009 | Akimoto | F02M 35/1222 |
| | | | | 123/184.53 |
| 2009/0112930 | A1* | 4/2009 | Anguiano | H04N 21/4532 |
| 2009/0165051 | A1* | 6/2009 | Armaly | H04N 21/4316 |
| | | | | 725/40 |
| 2009/0178073 | A1* | 7/2009 | Tsuria | H04N 21/4524 |
| | | | | 725/31 |
| 2010/0124399 | A1* | 5/2010 | Sofos | H04N 21/4135 |
| | | | | 386/241 |
| 2012/0233002 | A1* | 9/2012 | Abujbara | G16H 20/60 |
| | | | | 705/15 |
| 2014/0201777 | A1* | 7/2014 | Johansson | G06F 21/10 |
| | | | | 725/25 |
| 2016/0358085 | A1* | 12/2016 | Abadi | G16H 50/70 |
| 2018/0004914 | A1* | 1/2018 | Abujbara | G16H 20/60 |
| 2018/0241840 | A1* | 8/2018 | Hasek | H04W 4/02 |
| 2019/0230395 | A1* | 7/2019 | Flanagan | H04N 21/454 |
| 2022/0182719 | A1 | 6/2022 | Garcia et al. | |
| 2023/0156277 | A1 | 5/2023 | Garcia et al. | |

* cited by examiner

500

502 — Receive a Request From a First User Device Associated with a Profile to Record a Media Content Item Scheduled to Broadcast on a Second User Device, Associated with the Profile, at a Second Location, Wherein the First User Device is Different from the Second User Device

504 — Determine that the Media Content Item is Subject to a Blackout During a Blackout Period Within a Blackout Region

506 — Determine that the First User Device and the Second User Device are Associated with the Profile

508 — Determine that the First User Device is at a First Location Outside the Blackout Region

510 — In Response to Determining that the First User Device is Outside the Blackout Region, Access the Media Content Item for Recording on the Second User Device During the Blackout Period

512 — Transmit the Recorded Media Content Item to the First User Device After Expiry of the Blackout Period

FIG. 5

SYSTEMS AND METHODS FOR PROVIDING RECORDING OF A BLACKED-OUT MEDIA CONTENT ITEM

CROSS-REFERENCE TO RELATED APPLICATIONS

This application is a continuation of U.S. patent application Ser. No. 17/849,112, filed Jun. 24, 2022, which is a continuation of U.S. patent application Ser. No. 17/116,440, filed Dec. 9, 2020 (now U.S. Pat. No. 11,405,689), the disclosures of each application are incorporated by reference in their entireties.

BACKGROUND

The present disclosure relates to systems and methods for providing a recording of blacked out media content item. In particular, techniques are disclosed for providing the recording of blacked out media content item based on the user's location.

SUMMARY

A distribution facility often prevents viewing and recording of media content item by blacking out the media content item on a user's equipment. Such blackout occurs when the media content item is not broadcasted at the time on a channel it was scheduled to broadcast. During the blackout, the distribution facility may deliver replacement media or no media at all on that channel In one example, venue protection blackout may occur when a provider of a live event (e.g. sports, concerts, theatres, festivals, etc.) wants to protect the venue of the live event by preventing the event from being broadcasted within some geographic distance from the venue hosting the event. Thus, a programming blackout may occur on the channel scheduled to broadcast the live event on the user's equipment when the user's equipment is located within the geographic distance from the event. Current systems do not have a capability to record the blacked out content in the user's equipment during the blackout period.

In view of the foregoing, the present disclosure provides systems and related methods that provide recording of blacked out media content item regardless of the user's equipment being on the location within the geographic distance from which the media content item is blacked out. In one embodiment, a system receives a request from a user device (different from user equipment device) to record media content item on the user equipment device. The system determines that the media content item is subject to a blackout during a blackout period within a blackout region. The system determines that the user equipment device and the user device are associated with a same profile and that the user equipment device is in a location different from the user device. The system also determines that the location of the user device is outside the blackout region and thus accesses the media content item for recording on the user equipment device during the blackout period. The system further transmits the recorded media content item to the user device after the blackout period expires. In some embodiments, the system causes playback of the recorded media content item on the user device after the blackout period expires.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 depicts an illustrative flowchart of a process for providing recording of blacked-out media content item, in accordance with some embodiments of the disclosure.

DETAILED DESCRIPTION

As referred to herein, the term "media content item" may refer to information corresponding to media that can be categorized and communicated to a user or by a user in. Media content item may refer to any kind of video, audio, text, picture, or multimedia content, or any combination thereof. For example, a media content item may be a blog post, GIFS, memes, animations, photo posts, video posts (e.g. live videos), links, TV show, a movie, a song, a podcast, a video game, any other type of media or any combination thereof. The media content item may be displayed and/or played back to a user as text, a video, a series of pictures, audio or as a combination of any of these.

In various embodiments described herein, "blacked out media content application" is a type of application that provides a recording of a media content item that is blacked out. Blacked out media content item is any type of broadcast media content item that is being prevented from being viewed or recorded during a blackout period within a blackout region. In one embodiment, the blackout region is a geographical distance within which the broadcast media content item is being prevented from being viewed or recorded. In one embodiment, the blackout period is a time during which the broadcast media content item is prevented from being viewed or recorded. In one example, the blackout period is an entire time of the broadcast of the media content item. In another example, the blackout period is a portion of time during the broadcasted broadcast of the media content item. In a further example, the blackout period is a pre-determined length of time. In one embodiment, the blacked out media content item is a live event that is being prevented from being viewed or recorded within the blackout region. In The blackout region is at a location, which is within a geographical distance of the venue of the live event. Some examples of live events include sporting events, concerts, theatres, parades etc. In some embodiments, a blacked out media content item (BOMC) application may be provided as an on-line application (i.e., provided on a website), or as a stand-alone application on a server, user device, etc. Various devices and platforms that may implement the BOMC application are described in more detail below. In some embodiments, the BOMC application and/or any instructions for performing any of the embodiments discussed herein may be encoded on computer-readable. Computer-readable includes any medium capable of storing instructions and/or data. The computer-readable may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, card, register memory, processor caches, Random Access Memory ("RAM"), etc.

Figure 1:
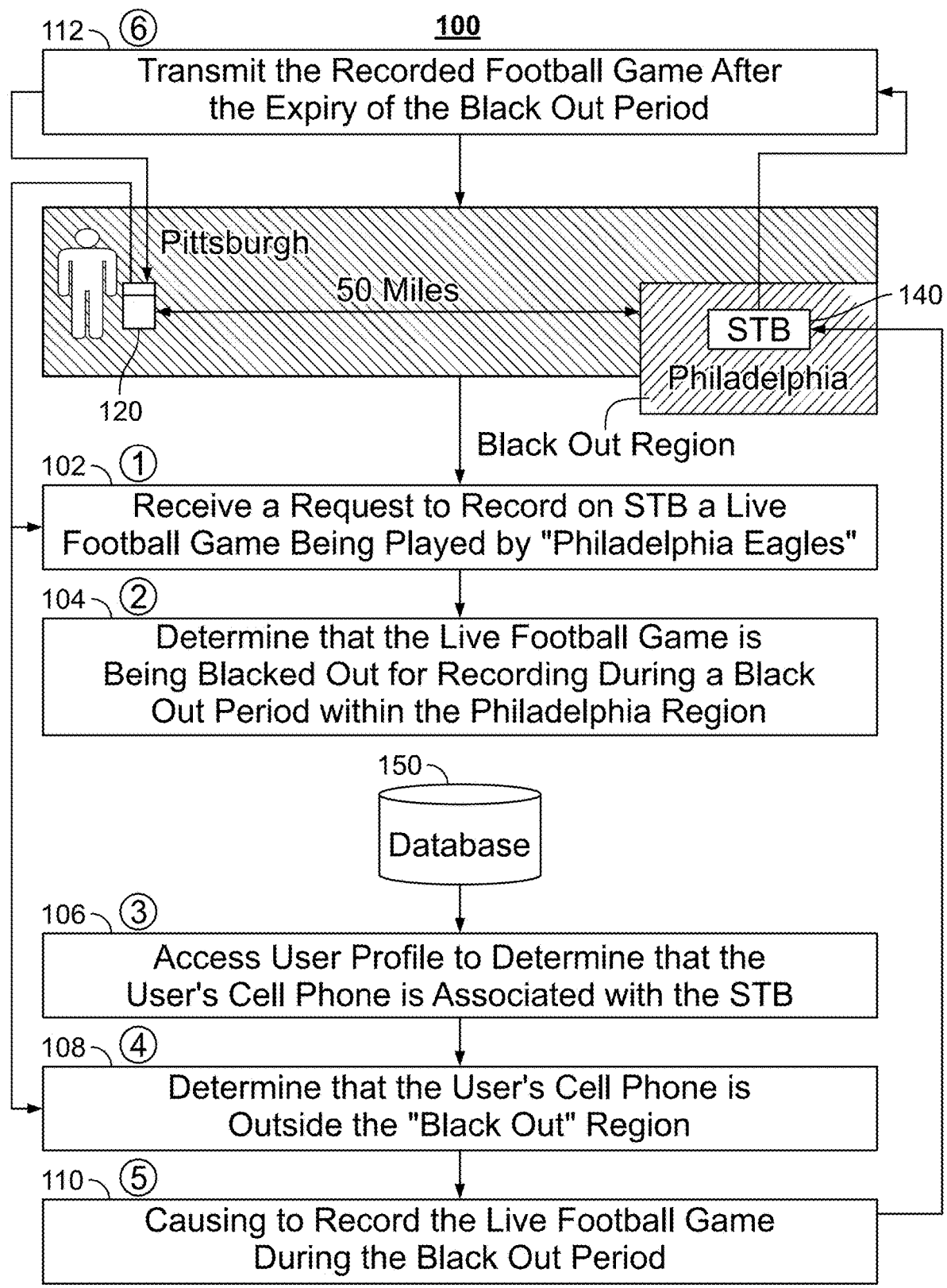
FIG. 1 depicts an illustrative example scenario for a media content item recordation application providing a recording of a blacked out content, in accordance with some embodiments of the disclosure.

FIG. 1 shows an exemplary operation 100 of the BOMC application. In some embodiments, the BOMC application may be executing on a server, or a client or combination of the server and the client of an OTT (over-the-top) media streaming application content provider that is providing a recording of the blacked out media content item. In one example, the BOMC application is executing on a media device of a user. In another example, the BOMC application is executing on equipment of a cable company.

In some embodiments, at step 102, the BOMC application may receive a request to record from a cell phone 120 on a user equipment device (e.g. a set-up box (STB) 140) a live football game being played by a team named "Philadelphia Eagles." In one embodiment, a STB 140 is a user equipment device (e.g. user television equipment 310a of FIG. 3) that receives a signal from an external source (e.g. media content source 304 of FIG. 3) and tunes the signal in a form that can be displayed on the user equipment device. As shown, in one example, the STB 140 is located in the city of Philadelphia in the state of Pennsylvania (PA). In one embodiment the request is received via a user device (e.g. wireless user communications device 310c) by a user. In one example, the user device is a cell phone 120. As shown, in one example, the user cell phone 120 is in the city of Pittsburgh in PA, which is approximately 50 miles outside the city of Philadelphia. At step 104, the BOMC application may determine that the football game is being blacked out for recording during a blackout period within the Philadelphia region (i.e. "Blackout region"). In one example, the Philadelphia region is a distance within the city of Philadelphia. As such the football game is blacked out from being viewed and/or recorded in the STB 140. In one embodiment, the football game is being blacked out from being viewed and/or recorded on subscription channel (e.g. local network channel) scheduled to broadcast the live football game on the STB. In one example, the blackout period is an entire time of the broadcast of the live football game. In another example, the blackout period is a portion of the time of the broadcast of the live football game. In a further example, the blackout period is a pre-determined length of time. In one example, the blackout period is a pre-determined length of time. Accordingly, the football game is blacked out from being viewed and/or recorded in the STB 140.

At step 106, the BOMC application accesses a user profile to determine that both the user's cell phone and the STB are associated with the same user profile. In one embodiment, database 150 includes a user profile listing a plurality of users and devices associated (belonging) to each of the plurality of the users. The BOMC application accesses the database 150 to determine that both the cell phone 120 and the STB 140 belongs to the same user. At step 108, the BOMC application determines that the user's cell phone is outside the blackout region. In one embodiment, the BOMC application determines that the user's cell phone 120 is located sufficiently remote from the STB 140. For example, the BOMC application determines that the cell phone 120 is located in the city of Pittsburgh, which is approximately 50 miles outside of the city of Philadelphia. In one embodiment, the BOMC application determines that the user's cell phone is located in a region where the live football game is not blacked out for recording. For example, the BOMC application determines that the live football game is not blacked out from recording in the city of Pittsburgh. At step 110, the BOMC application causes to record the live football game during the blackout period. As such, the live football game is recorded on the STB 140. In one embodiment, the live football game is recorded on the same subscription channel (e.g. local network channel) on which the football game is blacked out from being viewed and/or recorded. In one embodiment, the live football game is recorded on a pay television channel (e.g. pay per view).

At step 112, the BOMC application transmits the recorded football game after the expiry of the blackout period. As shown, the recorded football game is transmitted to the user's cell phone 120. In one embodiment, a request (e.g. user input) is received from the user's cell phone 120 to playback the football game. The BOMC application determines that the blackout period has expired and transmits the recorded football game to the user's cell phone 120. In one embodiment, the recorded football game is automatically transmitted to the user's cell phone 120 after the expiry of the blackout period without user input. In one example, the blackout period may expire at the conclusion of the football game. In one embodiment, the BOMC application notifies the user that the blackout period has expired. In one embodiment, the BOMC application generates for display the recorded football game on the user's cell phone 120 after the expiry of the blackout period. In one embodiment, the BOMC application, playback the recorded football game on the user's cell phone 120 after receiving a playback request from the user.

Figure 2:
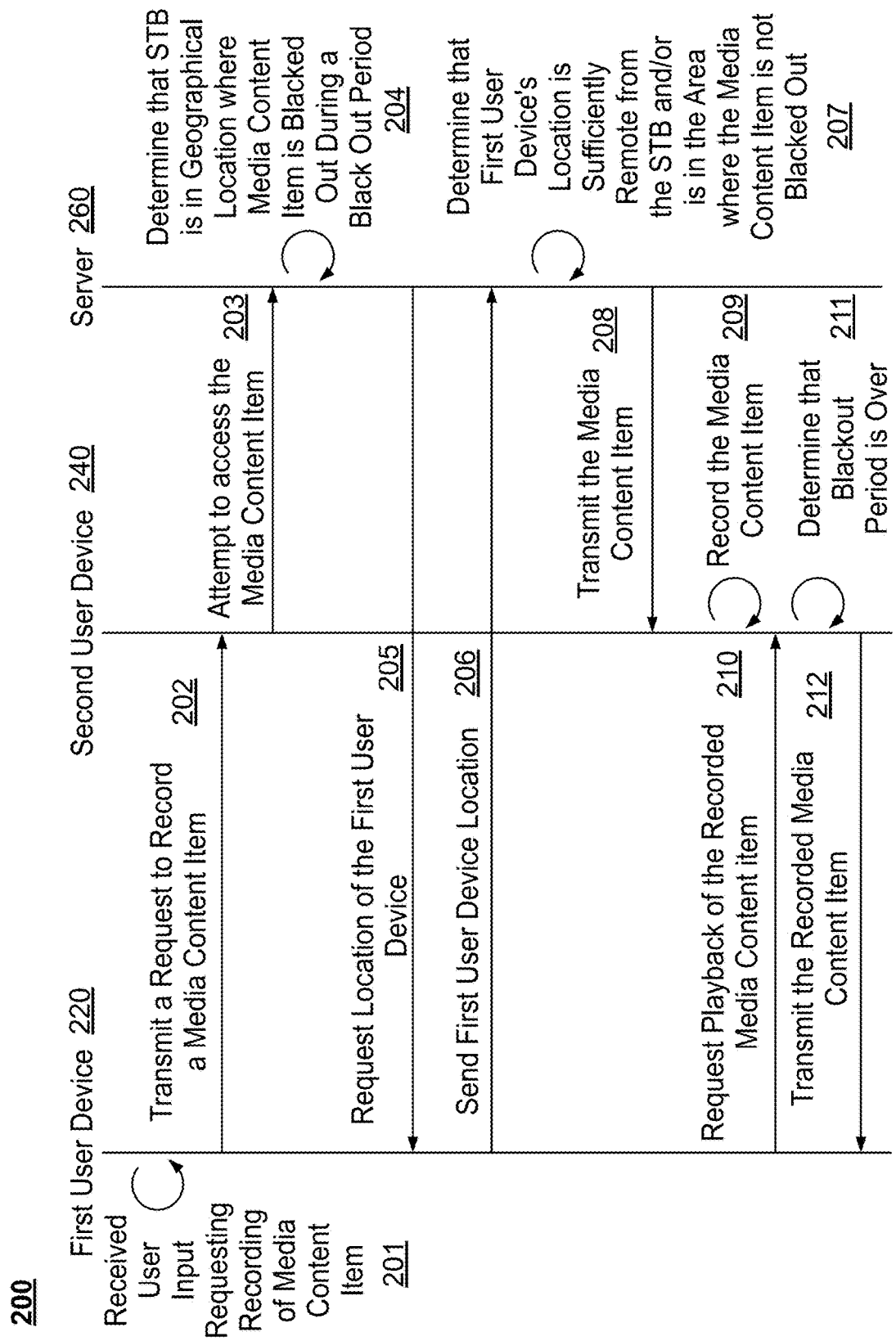
FIG. 2 depicts an illustrative example of an operational flow of sequence of steps for providing a recording of blacked out media content item performed by each of the two devices and the server, in accordance with some embodiments of the disclosure.

FIG. 2 shows an illustrative operational flow of a sequence of steps for providing recorded media content item in accordance with some embodiments of the disclosure. As shown in FIG. 2, method 200 provides for interaction between a variety of different systems including a first user device 220 (e.g. cell phone 220), a second user device 420 (e.g. STB 240) and a server 260.

As illustrated, the method 200 begins at step 201 when the first user device 220 receives user input requesting recording of a media content item. As discussed above, media content item may refer to any kind of video, audio, text, picture, or multimedia content, or any combination thereof. Upon receipt of the request, at step 202, the first user device 220 transmits the request to the second user device 240 to record the media content item. At step 203, the second user device 240 attempts to access the media content item from the server 260. Upon such attempt, at step 204, the server 260 determines that the second user device 240 is in a geographical location (i.e. "Blackout region") where the media content item is blacked out during a blackout period. In one embodiment, the media content item is being blacked out for recording during a blackout period within the geographical location. In one example, the blackout period is an entire time of the broadcast of the media content item. In another example, the blackout period is a portion of time during the broadcast of the media content item. In a further example, the blackout period is a pre-determined length of time. Accordingly, the media content item is blacked out from being viewed and/or recorded in the second user device 240.

In one embodiment, at step 205, the server 260 requests for a location of the first user device 220. Upon receipt of the request for the location, at step 206, the first user device 230 sends its location to the server 260. At step 207, the server 260 determines that the location of the first user device 220 is sufficiently remote from the second user device 240 and/or is in an area outside the geographical location where the media content item is not blacked out. Then, at step 208, the server 260 transmits the media content item 208 to the second user device 240. Upon receipt of the media content item the second user device 240 at step 209, records the blacked out media content item. At step 210, the first user device requests playback of the recorded media content item. Upon receipt of the playback request, at step 211, the second user device 240 determines that the blacked out period is over. In one embodiment, the blackout period is determined to be over at the conclusion of the broadcast of the media content item. In one embodiment, the blackout period may be determined to be over after the pre-determined length of time. At step 212, the second user device 240 transmits the recorded media content item to the first user device 220.

Figure 3:
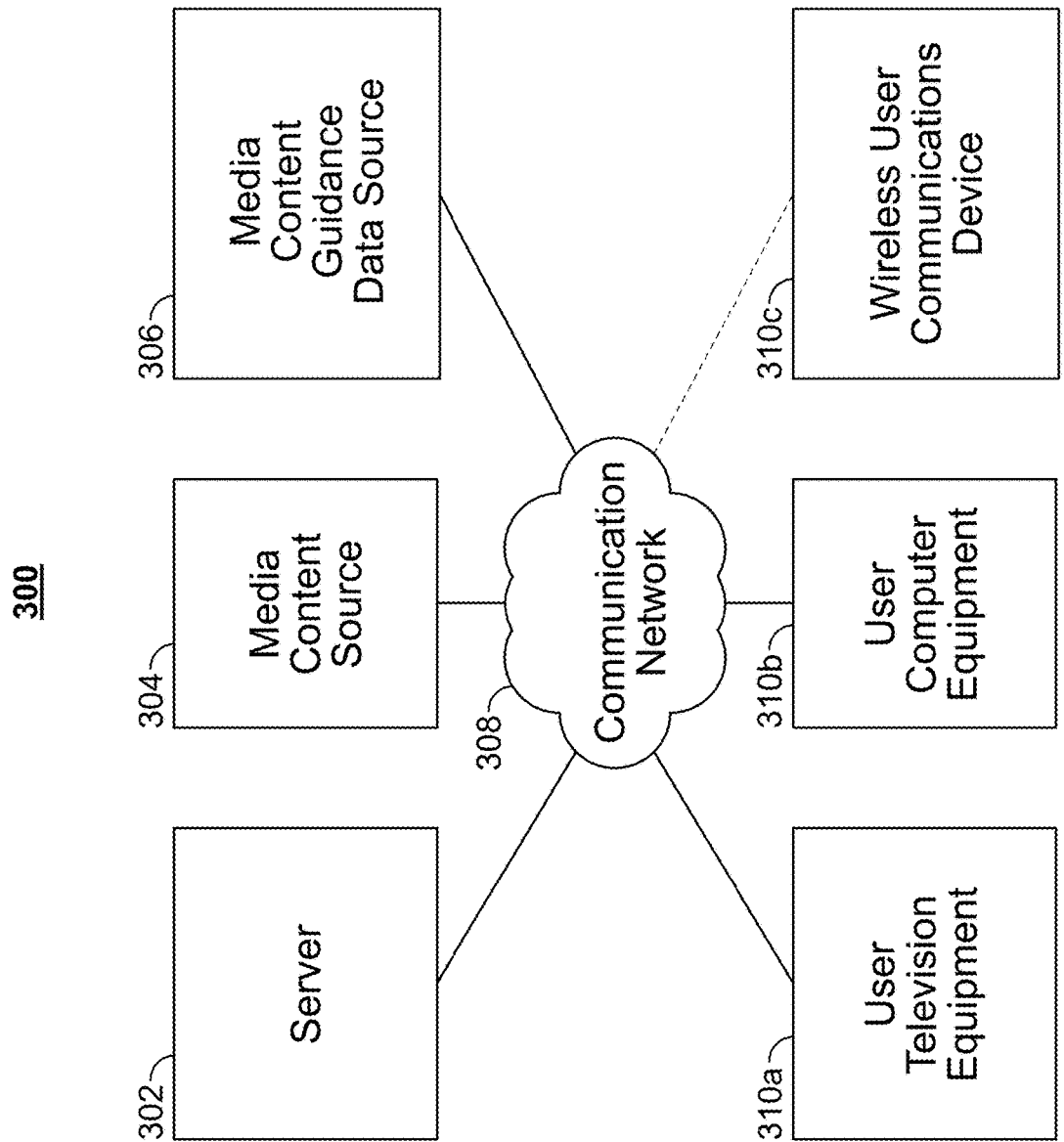
FIG. 3 shows an illustrative block diagram of a system hosting a media content item recordation application, in accordance with some embodiments of the disclosure.

FIG. 3 shows an illustrative block diagram of a system 300 for providing blacked out media content item for recording, in accordance with some embodiments of the disclosure. In various aspects, system 300 includes one or more of server 302, media content source 304, media content guidance data source 306, communication network 308, and one or more computing devices 310, such as user television equipment 310*a* (e.g., a set-top box), user computer equipment 310*b* (e.g., a laptop), and/or wireless user communications device 310*c* (e.g., a smartphone device). Although FIG. 3 shows one of each component, in various examples, system 300 may include fewer than the illustrated components and/or multiples of one or more illustrated components. Communication network 308 may be any type of communication network, such as the Internet, a mobile phone network, mobile voice or data network (e.g., a 4G or LTE network), cable network, public switched telephone network, or any combination of two or more of such communication networks. Communication network 308 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 308 communicatively couples various components of system 300 to one another. For instance, server 302 may be communicatively coupled to media content source 304, media content guidance data source 306, and/or computing device 310 via communication network 308.

In some examples, media content source 304 and media content guidance data source 306 may be integrated as one device. Media content source 304 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 304 may be the originator of content (e.g., a television broadcaster, a Webcast provider, etc.) or may not be the originator of content (e.g., an on-demand content provider, an Internet provider of content of broadcast programs for downloading, etc.). Media content source 304 may include cable sources, satellite providers, on-demand providers, Internet providers, over-the-top content providers, or other providers of content. Media content source 304 may also include a remote media server used to store different types of content (e.g., including video content selected by a user) in a location remote from computing device 310. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 304 and media content guidance data source 306 may provide content and/or content guidance data to computing device 310 and/or server 302 using any suitable approach. In some embodiments, media content guidance data source 306 may provide a stand-alone interactive television program guide that receives program guide data via a data feed (e.g., a continuous feed or trickle feed). In some examples, media content guidance data source 306 may provide program schedule data and other guidance data to computing device 310 on a television channel sideband, using an in-band digital signal, an out-of-band digital signal, or any other suitable data transmission technique.

As described in further detail below, server 302 manages the communication of a live content stream (e.g., a live sporting event broadcast, a live news broadcast, or the like) and recorded streams from media content source 304 to computing device 310 via communication network 308. For instance, in some embodiments, content from media content source 304 and/or guidance data from media content guidance data source 306 may be provided to computing device 310 using a client/server approach. In such examples, computing device 310 may pull content and/or content guidance data from server 302 and/or server 302 may push content and/or content guidance data to computing device 310. In some embodiments, a client application residing on computing device 310 may initiate sessions with server 302, media content source 304, and/or media content guidance data source 306 to obtain content and/or guidance data when needed, e.g., when the guidance data is out of date or when computing device 310 receives a request from the user to receive content or guidance data. In various aspects, server 302 may also be configured to detect events within the live content stream and, based on the detected events, control the display of content and/or navigation menu options via computing device 310. Additionally, although FIG. 3 shows media content source 304 and media content guidance data source 306 as separate from server 302, in some embodiments, media content source 304 and/or media content guidance data source 306 may be integrated as one device with server 302.

Content and/or content guidance data delivered to computing device 310 may be over-the-top (OTT) content. OTT content delivery allows Internet-enabled user devices, such as computing device 310, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide content guidance data described above. In addition to content and/or content guidance data, providers of OTT content can distribute applications (e.g., web-based applications or cloud-based applications), or the content can be displayed by applications stored on computing device 310.

Figure 4:
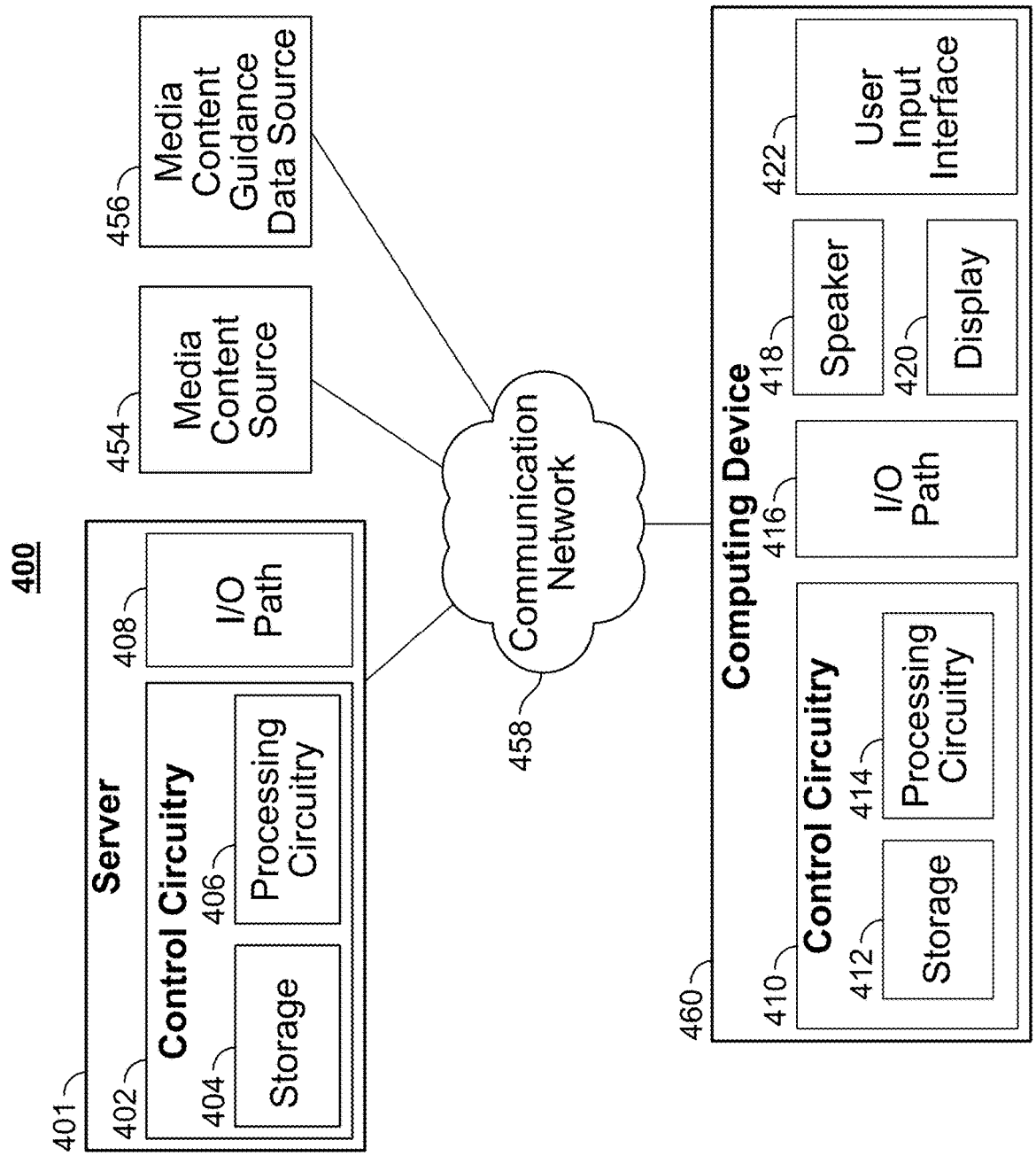
FIG. 4 is an illustrative block diagram showing additional details of a system hosting the media content item recordation application, in accordance with some embodiments of the disclosure.

FIG. 4 is an illustrative block diagram showing additional details of the system 400, in accordance with some embodiments of the disclosure. In particular, server 401 (e.g., the same server as server 302) includes control circuitry 402 and an input/output I/O circuitry 408, and control circuitry 402 includes storage 404 and processing circuitry 406. In one embodiment, the storage 404 includes non-transitory storage instructions that when executed by the processing circuitry 406 cause performance of blacked out media content item application as described in FIGS. 1 and 2 above. Computing device 460 (e.g., one or more of devices 310a, 310b, and 310c) includes control circuitry 410, I/O circuitry 416, speaker 418, display 420, and user input interface 422. Control circuitry 410 includes storage 412 and processing circuitry 414. Control circuitry 402 and/or 410 may be based on any suitable processing circuitry such as processing circuitry 406 and/or 414. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor.

Each of storage 404, storage 412, and/or storages of other components of system 400 (e.g., storages of media content source 454, media content guidance data source 456, and/or the like) may be an electronic storage device. In some embodiments, media content source 454 may be the same as media content source 304. In some embodiments, media content guidance data source 456 may be the same as media content guidance data source 306. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 404, storage 412, and/or storages of other components of system 400 may be used to store various types of content, content guidance data, and or other types of data. Non-volatile memory may also be used (e.g., to launch a boot-up routine and other instructions). Cloud-based storage may be used to supplement storages 404, 412 or instead of storages 404, 412. In some embodiments, control circuitry 402 and/or 410 executes instructions for the BOMC application stored in memory (e.g., storage 404 and/or 412). Specifically, control circuitry 402 and/or 410 may be instructed by the BOMC application to perform the functions discussed herein. In some implementations, any action performed by control circuitry 402 and/or 410 may be based on instructions received from the BOMC application. For example, the BOMC application may be implemented as software or a set of executable instructions that may be stored in storage 404 and/or 412 and executed by control circuitry 402 and/or 410. In some embodiments, the BOMC application may be a client/server BOMC application where only a client BOMC application resides on computing device 460, and a server BOMC application resides on server 401.

The BOMC application may be implemented using any suitable architecture. For example, it may be a stand-alone BOMC application wholly implemented on computing device 460. In such an approach, instructions for the BOMC application are stored locally (e.g., in storage 412), and data for use by the BOMC application is downloaded on a periodic basis (e.g., from an out-of-band feed, from an Internet resource, or using another suitable approach). Control circuitry 410 may retrieve instructions for the BOMC application from storage 412 and process the instructions to perform the functionality described herein. Based on the processed instructions, control circuitry 410 may determine what action to perform when input is received from user input interface 422.

In client/server-based embodiments, control circuitry 410 may include communication circuitry suitable for communicating with a BOMC application server (e.g., server 401) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 458). In some embodiments, communication network 458 may be the same as network 308. In another example of a client/server-based application, control circuitry 410 runs a web browser that interprets web pages provided by a remote server (e.g., server 401). For example, the remote server may store the instructions for the application in a storage device. The remote server may process the stored instructions using circuitry (e.g., control circuitry 402) and generate the displays discussed above and below. Computing device 460 may receive the displays generated by the remote server and may display the content of the displays locally via display 420. This way, the processing of the instructions is performed remotely (e.g., by server 401) while the resulting displays, such as the display windows described elsewhere herein, are provided locally on computing device 460. For example, computing device 460 may include display circuitry (e.g., video card circuitry or combination motherboard and video card circuitry) configured to generate for display the display windows. Computing device 460 may receive inputs from the user via input interface 422 and transmit those inputs to the remote server for processing and generating the corresponding displays.

A user may send instructions to control circuitry 402 and/or 410 using user input interface 422. User input interface 422 may be any suitable user interface, such as a remote control, trackball, keypad, keyboard, touchscreen, touchpad, stylus input, joystick, voice recognition interface, or other user input interfaces. User input interface 422 may be integrated with or combined with display 420, which may be a monitor, television, liquid crystal display (LCD), electronic ink display, or any other equipment suitable for displaying visual images.

Server 401 and computing device 460 may receive content and data via input/output (hereinafter "I/O") circuitries 408 and 416, respectively. Although, I/O circuitries are shown, some embodiments may include I/O paths coupled to the circuitries (e.g. network cards, transceivers etc.) For instance, I/O circuitry 416 is a circuitry that includes one or more of communication port configured to receive a live content stream from server 401 and/or media content source 454 via a communication network 458. Storage 412 may be configured to buffer the received live content stream for playback, and display 420 may be configured to present the buffered content, navigation options, alerts, and/or the like via a primary display window and/or a secondary display window. I/O circuitries 408, 416 may provide content (e.g., a live stream of content, broadcast programming, on-demand programming, Internet content, content available over a local area network (LAN) or wide area network (WAN), and/or other content) and data to control circuitry 402, 410. Control circuitry 402, 410 may be used to send and receive commands, requests, and other suitable data using I/O circuitries 408, 416. I/O circuitries 408, 416 may connect control circuitry 402, 410 (and specifically processing circuitry 406, 414) to one or more communication circuitries (described below). I/O functions may be provided by one or more of these communication circuitries but are shown as single paths in FIG. 4 to avoid overcomplicating the drawing.

Having described systems 300 and 400, reference is now made to FIG. 5, which depicts an illustrative flowchart of process 500 for providing recording of blacked out media content item that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500 (and of other processes described herein) as being implemented by certain components of systems 300 and 400, this is for purposes of illustration only, and it should be understood that other components of systems 300 and 400 may implement those steps instead. For example, steps of process 500 may be executed by server 302 and/or by computing device 460 to provide blacked out media content item for recording.

At step 502, I/O circuitry (e.g., I/O circuitry 408 of FIG. 4) receives a request from a first user device (e.g. STB in FIG. 1) associated with a profile to record a media content item scheduled to broadcast on a second user device (e.g. cell phone in FIG. 1) at a second location such that the first user device is different from the second user device. In one embodiment, the request is a user input at the first user device. Media content item may refer to any kind of video, audio, text, or multimedia content, or any combination thereof. In one embodiment, the I/O circuitry receives the request via an API from a server (e.g. server 401) or from a computing device 460. For example, I/O circuitry may access a screen (e.g. provide input for the algorithms) and receive the request from the computing device 460 via communications network (e.g., network 458). In one embodiment, the server 401 may store the media content items locally in storage 404.

At step 504, control circuitry (e.g. control circuitry 402) determines that the media content item is subject to a blackout during a blackout period within a blackout region. In one embodiment, the blackout region is a geographical distance within which the broadcast media content item is being prevented from being viewed or recorded. In one embodiment, the blackout period is a time during which the broadcast media content item is prevented from being viewed or recorded. In one example, the blackout period is an entire time of the broadcast of the media content item. In another example, the blackout period is a portion of time during the broadcast of the media content item. In a further example, the blackout period is a pre-determined length of time. In one embodiment, the media content item is blacked out from being recorded and/or viewed on the subscription channel (e.g. local network channel).

At step 506, the control circuitry determines that the first user device and the second user device are associated with the profile. In one embodiment, the control circuitry determines that the first device and the second user devices are associated with the same profile. For example, the control circuitry accesses user profile stored in a storage (e.g. storage 404) to determine that both the first and the second user devices belong to the same user. At step 508, the control circuitry determines that the first user device is outside the blackout region. In one embodiment, the first user device is located outside the geographic distance from which the requested media content item is blacked out. In one embodiment, the second user device is located within the blackout region. In one example the first user device is located sufficiently remote from the second user device. At step 508, in response to determining that the first user device is outside the blackout region, the control circuitry accesses the media content item for recording on the second user device during the blackout period. In one embodiment, the media content item is recorded on the subscription channel (e.g. local network channel). In one embodiment, the media content item is recorded on the pay television channel (e.g. pay per view). At step 510, the control circuitry transmits the recorded media content item to the first user device after expiry of the blackout period. In one embodiment, the control circuitry transmits the recorded media content item to the second user device after conclusion of the blackout period. In one embodiment, the control circuitry transmits the recorded media content item to the second user device after conclusion of the blackout period without receiving request from the second user device. In one embodiment, the control circuitry stores the recorded media content item in the first user device after the transmission of the recorded media content item. In one embodiment, the control circuitry causes the playback of the stored media content item on the first user device. In one embodiment, the control circuitry receives a request from the second user device to playback the recorded media content item. The control circuitry determines that the blackout period has expired. In one example, the blackout period expires after conclusion of the recording of the media content item. The control circuitry permits the recorded media content to be played back on the first user device when the blackout period expires.

The above-described embodiments of the present disclosure are presented for purposes of illustration and not of limitation, and the present disclosure is limited only by the claims that follow. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving, from a first device associated with a user profile, a request to access a content item via the first device;
   determining that the content item is subject to a blackout in a blackout region during a blackout period;
   determining that the first device is outside of the blackout region, wherein the request was received during the blackout period; and
   in response to the determining that the first device is outside of the blackout region:
   causing recording of the content item during the blackout period; and
   transmitting, via a communication network, the recorded content item to the first device after expiration of the blackout period.

2. The method of claim 1, further comprising:
   generating for play the content item on the first device after the expiration of the blackout period.

3. The method of claim 1, further comprising:
   enabling storing the recorded media content item in a memory of the first device after the transmitting of the content item, and enabling play of the content item stored on the first device.

4. The method of claim 1, further comprising:
   determining a first source configured to transmit the content item to a location of a second device, wherein the second device is associated with the user profile and is in the blackout region; and
   determining a second source, different from the first source, configured to transmit the content item to a location of the second device.

5. The method of claim 1, further comprising:
   determining a first source configured to transmit the content item to a location of a second device, wherein the second device is associated with the user profile and is in the blackout region;
   determining a second source, different from the first source, configured to transmit the content item;
   wherein one or more of the first source and the second source broadcasts the content item at a previously scheduled time slot.

6. The method of claim 1, wherein the blackout period is an entire time of a previously scheduled broadcast time of the content item from a broadcasting channel in the blackout region, and the blackout period expires at the end of the broadcast time of the content item.

7. The method of claim 1, wherein the blackout period is a portion of time of a broadcast of the content item.

8. The method of claim 1, wherein a second device is associated with the user profile and is in the blackout region, wherein the content item is caused to be recorded by the second device during the blackout period.

9. A system comprising:
   input/output (I/O) circuitry configured to receive, from a first device associated with a user profile, a request to access a content item via the first device; and
   processing circuitry communicably coupled to the I/O circuitry and configured:
   to determine that the content item is subject to a blackout in a blackout region during a blackout period;
   to determine that the first device is outside of the blackout region, wherein the request was received during the blackout period; and
   in response to determining that the first device is outside the blackout region:
   to cause recording of the content item during the blackout period; and
   to cause transmitting, via a communication network, the recorded content item to the first device after expiration of the blackout period.

10. The system of claim 9, wherein the processing circuitry is configured to generate for play the transmitted content item on the first device after the expiration of the blackout period.

11. The system of claim 9, wherein the processing circuitry is configured to enable storing the recorded media content item in a memory of the first device after the transmitting of the content item, and to enable play of the content item stored on the first device.

12. The system of claim 9, wherein the processing circuitry is configured:
    to determine a first source configured to transmit the content item to a location of a second device, wherein the second device is associated with the user profile and is in the blackout region; and
    to determine a second source, different from the first source, configured to transmit the content item to a location of the second device.

13. The system of claim 9, wherein the processing circuitry is configured:
    to determine a first source configured to transmit the content item to a location of a second device, wherein the second device is associated with the user profile and is in the blackout region; and
    to determine a second source, different from the first source, configured to transmit the content item to the location of the second device,
    wherein one or more of the first source and the second source broadcasts the content item at a previously scheduled time slot.

14. The system of claim 9, wherein the blackout period is an entire time of a previously scheduled broadcast time of the content item from a broadcasting channel in the blackout region, and the blackout period expires at the end of the broadcast time of the content item.

15. The system of claim 9, wherein the blackout period is a portion of time of a broadcast of the content item.

16. The system of claim 9, wherein a second device is associated with the user profile and is in the blackout region, wherein the content item is caused to be recorded by the second device during the blackout period.

17. A non-transitory computer readable medium comprising instructions that, when executed by a processor, are configured to cause control circuitry:
    to receive, from a first device associated with a user profile, a request to access a content item via the first device;
    to determine that the content item is subject to a blackout in a blackout region during a blackout period;
    to determine that the first device is outside of the blackout region, wherein the request was received during the blackout period; and
    in response to determining that the first device is outside the blackout region:
    to cause recording of the content item during the blackout period; and
    to cause transmitting, via a communication network, the recorded content item to the first device after expiration of the blackout period.

18. The system of claim 17, wherein the processing circuitry is configured:
   to determine a first source configured to transmit the content item to a location of a second device, wherein the second device is associated with the user profile and is in the blackout region; and
   to determine a second source, different from the first source, configured to transmit the content item to a location of the second device.

19. The system of claim 17, wherein the processing circuitry is configured:
   to determine a first source configured to transmit the content item to a location of a second device, wherein the second device is associated with the user profile and is in the blackout region; and
   to determine a second source, different from the first source, configured to transmit the content item to the location of the second device,
   wherein one or more of the first source and the second source broadcasts the content item at a previously scheduled time slot.

20. The system of claim 17, wherein a second device is associated with the user profile and is in the blackout region,
   wherein the content item is caused to be recorded by the second device during the blackout period.

* * * * *